(12) United States Patent
Poornachandran et al.

(10) Patent No.: US 10,592,670 B2
(45) Date of Patent: Mar. 17, 2020

(54) TECHNOLOGIES FOR PROVISIONING AND MANAGING SECURE LAUNCH ENCLAVE WITH PLATFORM FIRMWARE

(71) Applicant: Intel Corporation, Santa Clara, CA (US)

(72) Inventors: Rajesh Poornachandran, Portland, OR (US); Vincent J. Zimmer, Federal Way, WA (US); Mingqiu Sun, Beaverton, OR (US); Gopinatth Selvaraje, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 15/195,320

(22) Filed: Jun. 28, 2016

(65) Prior Publication Data
US 2017/0372076 A1    Dec. 28, 2017

(51) Int. Cl.
*G06F 21/57*    (2013.01)
*H04L 9/32*    (2006.01)
(Continued)

(52) U.S. Cl.
CPC ............ *G06F 21/575* (2013.01); *G06F 21/53* (2013.01); *G06F 21/74* (2013.01); *H04L 9/0897* (2013.01);
(Continued)

(58) Field of Classification Search
CPC ........ G06F 21/575; G06F 21/53; G06F 21/74; G06F 9/4401; G06F 9/44; G06F 2221/034; H04L 9/0897; H04L 9/3268
See application file for complete search history.

(56) References Cited

U.S. PATENT DOCUMENTS 9,798,641 B2 * 10/2017 Swanson ................... G06F 1/24
2015/0033012 A1 * 1/2015 Scarlata ................ H04L 9/3242
713/161
(Continued)

OTHER PUBLICATIONS

Costan et al, "Intel SGX Explained", no date provided, Computer Science and Artificial Intelligence Labratory, Massachusetts Institute of Technlogy, p. 1-118.*
(Continued)

*Primary Examiner* — Christopher A Revak
(74) *Attorney, Agent, or Firm* — Barnes & Thornburg LLP (57) ABSTRACT

Technologies for configuring a launch enclave include a computing device having a processor with secure enclave support. A trusted execution environment (TEE) of the computing device stores a launch enclave hash in a launch enclave hash table in secure storage and provisions the launch enclave hash to platform firmware at runtime. The TEE may receive the launch enclave hash via trusted I/O. The platform firmware sets a configure enclave launch bit and resets the computing device. On reset, the TEE determines whether the launch enclave hash is allowed for launch. The TEE may evaluate one or more launch configuration policies and may select a launch enclave hash based on the launch configuration policies. If allowed, the platform firmware writes the launch enclave hash to a model-specific register of the processor, and the launch enclave may be loaded and verified with the launch enclave hash. Other embodiments are described and claimed.

25 Claims, 3 Drawing Sheets

(51) Int. Cl.
  *G06F 21/74* (2013.01)
  *G06F 21/53* (2013.01)
  *H04L 9/08* (2006.01)
  *G06F 9/44* (2018.01)
  *G06F 9/4401* (2018.01)
(52) U.S. Cl.
  CPC .............. *H04L 9/3268* (2013.01); *G06F 9/44* (2013.01); *G06F 9/4401* (2013.01); *G06F 2221/034* (2013.01)

(56) References Cited

U.S. PATENT DOCUMENTS

| | | | | |
|---|---|---|---|---|
| 2015/0347768 | A1* | 12/2015 | Martin | G06F 21/62 726/1 |
| 2015/0379306 | A1* | 12/2015 | Zimmer | G06F 21/72 713/193 |
| 2016/0171248 | A1* | 6/2016 | Nesher | G06F 21/53 713/190 |
| 2016/0283411 | A1* | 9/2016 | Sheller | G06F 12/1458 |
| 2017/0185776 | A1* | 6/2017 | Robinson | G06F 9/45558 |
| 2017/0289151 | A1* | 10/2017 | Shanahan | H04L 63/0876 |
| 2018/0096137 | A1* | 4/2018 | Trostle | G06F 21/53 |
| 2018/0139044 | A1* | 5/2018 | Lange | G06F 21/53 |
| 2018/0212966 | A1* | 7/2018 | Costa | H04L 63/10 |

OTHER PUBLICATIONS

Brekalo et al, "Mitigating Password Database Breaches with Intel SGX", Dec. 2016, SysTEX '16, ACM, p. 1-6.*

Xiao et al, "STACCO: Differently Analyzing Side-Channel Traces for Detecting SSL/TLS Vulnerabilities in Secure Enclaves", Oct./Nov. 2017, Session D3: Logic Side Channels, CCS '17, p. 859-874.*

* cited by examiner

TECHNOLOGIES FOR PROVISIONING AND MANAGING SECURE LAUNCH ENCLAVE WITH PLATFORM FIRMWARE

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. For typical systems, a launch enclave provided by a manufacturer of the processor may be responsible for launching, verifying, and otherwise managing all other enclaves executed by the computing device, including enclaves provided by independent software vendors. The launch enclave may function as the licensing root for all secure enclaves executed by the system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
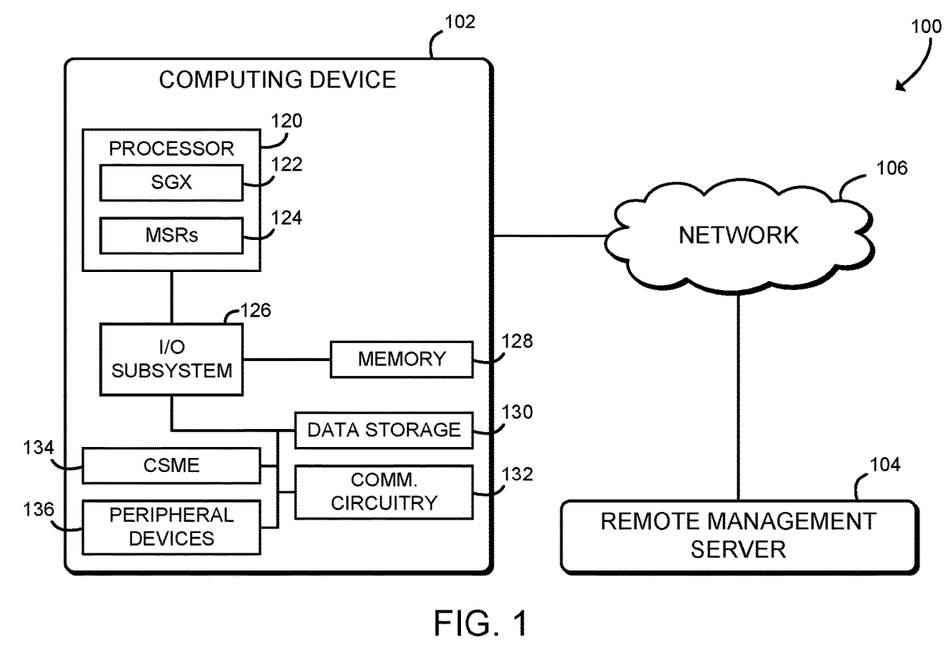
FIG. 1 is a simplified block diagram of at least one embodiment of a system for provisioning and managing a launch enclave.

Referring now to FIG. 1, in an illustrative embodiment, a system 100 for provisioning and managing launch enclaves includes a computing device 102 with a processor 120 that supports secure enclaves (e.g., a processor 120 that supports Intel® SGX technology). The system 100 may also include a remote management server 104 in communication with the computing device 102 via a network 106. In use, as described further below, the computing device 102 includes a trusted execution environment that receives a launch enclave hash corresponding to a launch enclave and provisions the launch enclave hash to platform firmware. The launch enclave may be supplied or otherwise selected by, for example, an original equipment manufacturer (OEM) of the computing device 102. The platform firmware sets a configure enclave launch bit and the computing device 102 resets. Upon reset, the trusted execution environment determines whether to allow the use of the launch enclave hash, for example by evaluating one or more launch configuration policies. If allowed, the platform firmware programs the processor 120 with the launch enclave hash (for example, by programming one or more registers) and then the launch enclave may be securely loaded and executed by the processor 120. Additionally, although illustrated as including a single computing device 102 and remote management server 104, it should be understood that in some embodiments the system 100 may include any number of computing devices 102 and/or remote management servers 104. Thus, the system 100 may allow an OEM of a computing device 102, an enterprise, or other administrator to efficiently manage launch enclaves on large numbers of computing devices 102. The system 100 also may allow policy-based selection of launch enclaves, for example allowing different launch enclaves to be used for different platform lifecycle phases. Additionally, the system 100 may allow the platform firmware to perform secure user challenges at runtime, through the use of the trusted execution environment.

The computing device 102 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively includes a processor 120, an input/output subsystem 126, a memory 128, a data storage device 130, and a communication subsystem 132. Of course, the computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 128. The secure enclave support 122 may be embodied as a set of processor instruction extensions that allows the processor 120 to establish one or more secure enclaves in the memory 128. For example, the secure enclave support 122 may be embodied as Intel® Software Guard Extensions (SGX) technology.

As shown, the processor 120 also includes one or more model-specific registers (MSRs) 124. The MSRs 124 may be programmed by software to configure various features of the processor 120. In particular, the processor 120 may include one or more launch enclave MSRs 124 that may be programmed to store an enclave hash for a launch enclave of the computing device 102. For example, some processors 120 manufactured by Intel Corporation may support one or more MSRs 124 identified as IA32 SGXLEPUBKEYHASHx (for x from zero to three). The enclave hash may be embodied as a hash of a public key corresponding to the private key used to sign the launch enclave. For example, in some embodiments, the launch enclave may be signed by the OEM of the computing device 102.

The memory 128 may be embodied as any type of volatile or non-volatile memory or data storage capable of performing the functions described herein. In operation, the memory 128 may store various data and software used during operation of the computing device 102 such as operating systems, applications, programs, libraries, and drivers. Additionally, part of the memory 128 may be used as an enclave page cache (EPC) to store encrypted code and/or data for the secure enclaves established by the processor 120. The processor 120 may encrypt memory pages of each secure enclave before transferring the encrypted pages out of the processor 120 to the EPC within the memory 128.

The memory 128 is communicatively coupled to the processor 120 via the I/O subsystem 126, which may be embodied as circuitry and/or components to facilitate input/output operations with the processor 120, the memory 128, and other components of the computing device 102. For example, the I/O subsystem 126 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing device 102, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. In some embodiments, the data storage device 130 may be used to store one or more executable binary images. Each executable binary image may include unencrypted code and/or data that is to be initially loaded into a secure enclave and then measured or otherwise verified before the secure enclave is executed.

The communication subsystem 132 of the computing device 102 may be embodied as any communication circuit, device, or collection thereof, capable of enabling communications between the computing device 102 and other remote devices over a network. The communication subsystem 132 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 102 may also include a converged security and manageability engine (CSME) 134 and one or more peripheral devices 136. The CSME 134 may be embodied as any hardware component(s) or circuitry capable of providing manageability and security-related services to the computing device 102. In particular, the CSME 134 may include a microprocessor, microcontroller, or other embedded controller capable of executing firmware and/or other code independently and securely from the processor 120. Thus, the CSME 134 may be used to establish a trusted execution environment for the computing device 102. The CSME 134 may communicate with the processor 120 and/or other components of the computing device 102 over a dedicated bus, such as a host embedded controller interface (HECI). The CSME 134 may also provide remote configuration, control, or management of the computing device 102. Further, in some embodiments, the CSME 134 is also capable of communicating using the communication subsystem 132 or a dedicated communication circuit independently of the state of the computing device 102 (e.g., independently of the state of the main processor 120), also known as "out-of-band" communication. Illustratively, the CSME 134 is incorporated in a system-on-a-chip (SoC) of the computing device 102; however, in some embodiments, the computing device 102 may include one or more additional components capable of establishing a trusted execution environment, such as a security engine, an out-of-band processor, a Trusted Platform Module (TPM), and/or another security engine device or collection of devices. The CSME 134 may verify that the enclave hash stored in the associated secure storage (not shown in FIG. 1) matches the signature of the launch enclave before allowing the launch enclave to be initialized and/or otherwise executed. In some embodiments, the CSME 134 and secure storage may support a default enclave hash for a default launch enclave, such as a launch enclave provided by a manufacturer of the processor 120.

The peripheral devices 136 may include any number of additional input/output devices, interface devices, and/or other peripheral devices. For example, in some embodiments, the peripheral devices 136 may include a display, touch screen, graphics circuitry, keyboard, mouse, speaker system, microphone, network interface, and/or other input/output devices, interface devices, and/or peripheral devices.

The remote management server 104 may be embodied as any type of computation or computer device capable of performing the functions described herein, including, without limitation, a computer, a multiprocessor system, a server, a rack-mounted server, a blade server, a network appliance, a distributed computing system, a processor-based system, and/or a consumer electronic device. As such, the remote management server 104 may be embodied as a single server computing device or a collection of servers and associated devices. For example, in some embodiments, the remote management server 104 may be embodied as a "virtual server" formed from multiple computing devices distributed across the network 106 and operating in a public or private cloud. Accordingly, although the remote management server 104 is illustrated in FIG. 1 and described below as embodied as a single server computing device, it should be appreciated that the remote management server 104 may be embodied as multiple devices cooperating together to facilitate the functionality described below. The remote management server 104 may include a processor, an I/O subsystem, a memory, a data storage device, a communication subsystem, and/or other components and devices commonly found in a server or similar computing device. Those individual components of the remote management server 104 may be similar to the corresponding components of the computing device 102, the description of which is applicable to the corresponding components of the remote management server 104 and is not repeated herein so as not to obscure the present disclosure.

As discussed in more detail below, the computing device 102 and the remote management server 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet or RF network. As such, the network 106 may include any number of additional devices, such as additional computers, routers, and switches, to facilitate communications among the devices of the system 100.

Figure 2:
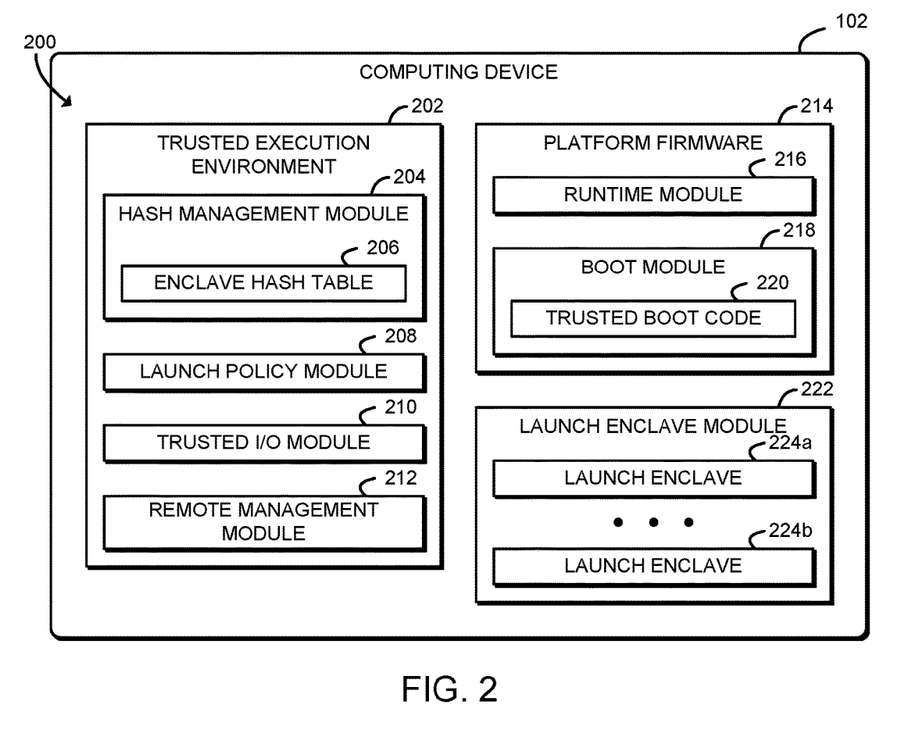
FIG. 2 is a simplified block diagram of at least one embodiment of an environment that may be established by a computing device of FIG. 1.

Referring now to FIG. 2, in an illustrative embodiment, the computing device 102 establishes an environment 200 during operation. The illustrative environment 200 includes a trusted execution environment 202, platform firmware 214, and a launch enclave module 222. The trusted execution environment 202 includes a hash management module 204, a launch policy module 208, a trusted I/O module 210, and a remote management module 212. The platform firmware 214 includes a runtime module 216 and a boot module 218. The various modules of the environment 200 may be embodied as hardware, firmware, software, or a combination thereof. As such, in some embodiments, one or more of the modules of the environment 200 may be embodied as circuitry or collection of electrical devices (e.g., hash management circuitry 204, launch policy circuitry 208, trusted I/O circuitry 210, remote management circuitry 212, runtime circuitry 216, boot circuitry 218, and/or launch enclave circuitry 222). It should be appreciated that, in such embodiments, one or more of the hash management circuitry 204, the launch policy circuitry 208, the trusted I/O circuitry 210, the remote management circuitry 212, the runtime circuitry 216, the boot circuitry 218, and/or the launch enclave circuitry 222 may form a portion of one or more of the processor 120, the I/O subsystem 126, and/or other components of the computing device 102. Additionally, in some embodiments, one or more of the illustrative modules may form a portion of another module and/or one or more of the illustrative modules may be independent of one another.

The trusted execution environment 202 may be embodied as any isolated and secure execution environment within the environment 200. Code and/or data accessed by the trusted execution environment 202 may be validated and protected from unauthorized access and/or modification. Additionally, the trusted execution environment 202 has access to dedicated, secure storage (not shown in FIG. 2). In the illustrative embodiment, the trusted execution environment 202 is provided by the CSME 134, which provides a secure execution environment that is independent from the processor 120 of the computing device 102. Additionally or alternatively, in other embodiments the trusted execution environment 202 may be provided with a secure enclave or other secure software environment such as an Intel SGX secure enclave, an AMD® TrustZone® secure world, or other secure environment. As shown, the trusted execution environment 202 includes the hash management module 204, the launch policy module 208, the trusted I/O module 210, and the remote management module 212.

The hash management module 204 is configured to store a launch enclave hash in a launch enclave hash table 206. The launch enclave hash may be stored in response to receiving the launch enclave hash, for example via trusted I/O or from the remote management server 104 as described further below. The launch enclave hash may include a hash of a public key, and the associated launch enclave is signed by a private key corresponding to the public key. The public key may correspond to, for example, an original equipment manufacturer (OEM) of the computing device 102. The launch enclave hash table 206 may be stored in a secure storage of the computing device 102. The hash management module 204 is further configured to provision the launch enclave hash to the platform firmware 214. The hash management module 204 may be further configured to update the launch enclave hash table 206 with a launch policy associated with the launch enclave hash in response to storing the launch enclave hash.

The launch policy module 208 is configured to determine whether the launch enclave hash is allowed for launch in response to a reset of the computing device 102 with a configure enclave launch bit set, as described further below. Determining whether the launch enclave hash is allowed for launch may include evaluating a launch policy associated with the launch enclave hash, for example determining a location of the computing device 102, determining a device context of the computing device 102, and/or determining a platform lifecycle phase of the computing device 102. In some embodiments, the launch enclave hash table 206 may store multiple launch enclave hashes, and the launch policy module 208 may be further configured to select the launch enclave hash from the launch enclave hash table 206 based on the associated launch policy. In some embodiments, the launch policy module 208 may be configured to perform a policy-based action in response to determining that the launch enclave hash is not allowed for launch. Additionally or alternatively, in some embodiments the launch policy module 208 may be further configured to notify a remote administrator in response to determining that the launch enclave hash is allowed for launch.

The trusted I/O module 210 is configured to open a trusted I/O session and receive the launch enclave hash via the trusted I/O session. The trusted I/O session may be opened in response a request from the platform firmware 214 to start the trusted I/O session. The remote management module 212 is configured to receive the launch enclave hash from the remote management server 104 via an out-of-band network connection, such as an out-of-band network interface of the CSME 134.

The platform firmware 214 may be embodied as a firmware environment of the computing device 102 including pre-boot and runtime components. For example, the platform firmware 214 may be embodied as firmware environment that complies with the United Extensible Firmware Interface ("UEFI") specification or as non-UEFI firmware such as legacy BIOS or coreboot. The platform firmware 214 may be responsible for low-level platform and device initialization during boot of the computing device 102 as well as selecting and loading an operating system. After the operating system takes control of the computing device 102 (for example, after the platform firmware 214 exits boot services), the platform firmware 214 may continue to provide certain firmware services at runtime. The platform firmware 214 may include one or more firmware volumes, firmware images, or other firmware components, which may be stored by the data storage device 130 and/or other non-volatile storage of the computing device 102. As shown, the platform firmware 214 includes the runtime module 216 and the boot module 218.

The runtime module 216 is configured to set a configure enclave launch bit in response to being provisioned with the launch enclave hash from the trusted execution environment 202. The runtime module 216 is further configured to reset the computing device 102 after setting the configure enclave launch bit. The runtime module 216 may be further configured to seal the launch enclave hash to generate an encrypted hash that is bound to a trusted firmware boot code 220 of the computing device 102. The runtime module 216 may be further configured to request the trusted execution environment 202 to start a trusted I/O session to receive the launch enclave hash.

The boot module 218 is configured to write the launch enclave hash to the launch enclave model-specific register 124 of the processor 120 in response to the trusted execution environment 202 determining that the launch enclave hash is allowed for launch by the launch policy module 208. The boot module 218 may be configured to determine whether the configure enclave launch bit is set in response to a reset of the computing device 102 and to provide the launch enclave hash to the trusted execution environment 202 in response to determining that the configure enclave launch bit is set. As shown, the boot module 218 may include the trusted firmware boot code 220, which may be embodied as a firmware image, firmware volume, or other early boot code. The boot module 218 may be further configured to unseal, by the trusted firmware boot code 220, an encrypted hash to recover the launch enclave hash. The boot module 218 may be further configured to write a default launch enclave hash to the launch enclave model-specific register 124 in response to determining that the configure enclave launch bit is not set by the launch policy module 208. The default launch enclave hash may correspond, for example, to the public key of a manufacturer of the processor 120.

The launch enclave module 222 is configured to load a launch enclave 224 in response to writing the launch enclave hash to the launch enclave model-specific register 124. As described above, the launch enclave 224 is protected by the secure enclave support 122 of the processor 120, and the launch enclave 224 may be verified with the launch enclave model-specific register 124 of the processor 120. As shown, the launch enclave module 222 may launch and otherwise manage one or more launch enclaves 224. Each launch enclave 224 may be embodied as a secure enclave that may be executed using the secure enclave support 122 of the processor 120, such as an Intel® SGX secure enclave. Each launch enclave 224 may be capable of launching and otherwise managing other secure enclaves on the computing device 102. In particular, a launch enclave 224 may serve as the licensing root for all software executed by the computing device 102 using the secure enclave support 122 of the processor 120. Each launch enclave 224 may be supplied, for example, by the OEM of the computing device 102.

Figure 3:
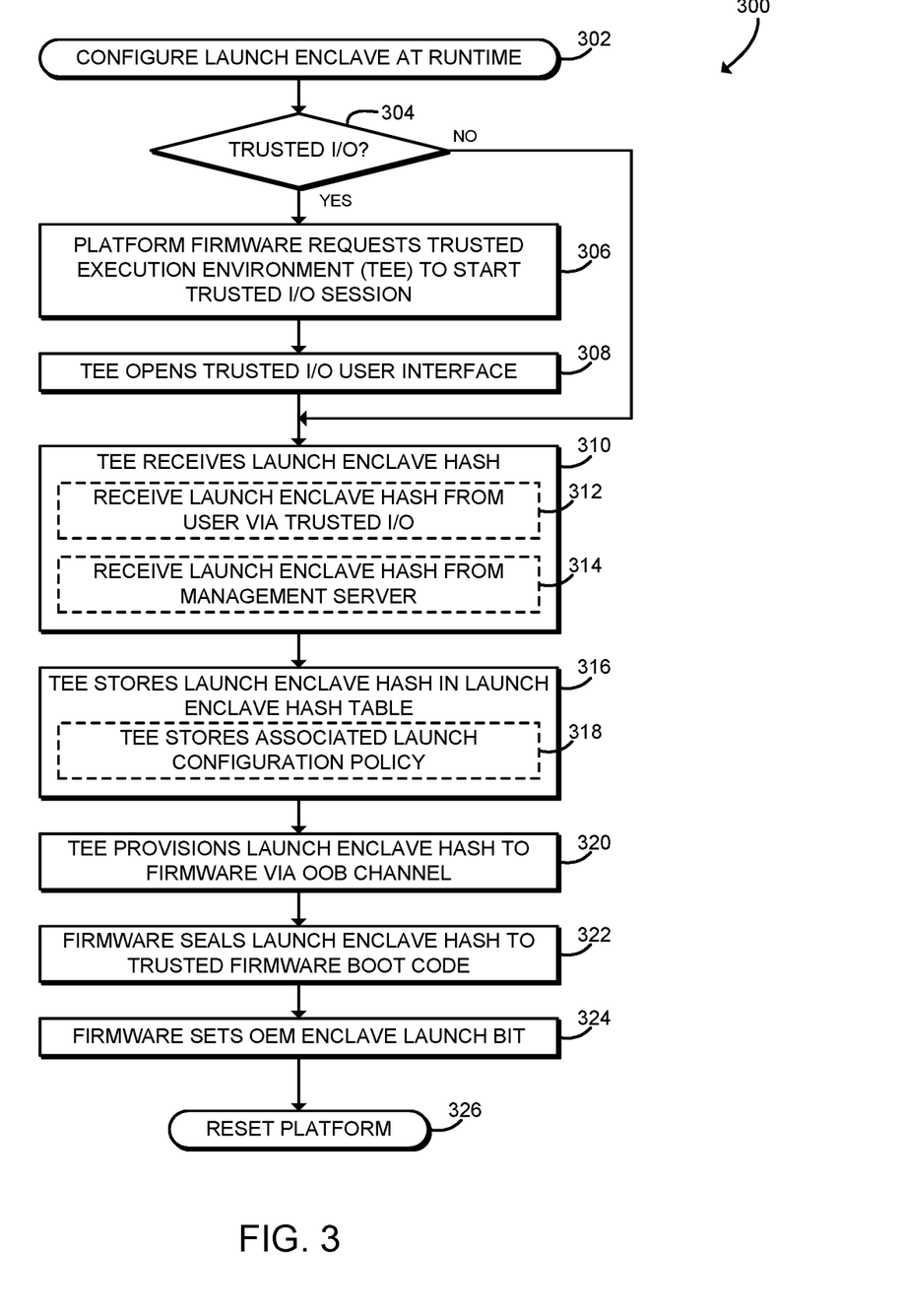
FIG. 3 is a simplified flow diagram of at least one embodiment of a method for runtime configuration of a launch enclave that may be executed by the computing device of FIGS. 1-2.

Referring now to FIG. 3, in use, the computing device 102 may execute a method 300 for launch enclave configuration at runtime. It should be appreciated that, in some embodiments, the operations of the method 300 may be performed by one or more modules of the environment 200 of the computing device 102 as shown in FIG. 2. The method 300 begins in block 302, in which the computing device 102 starts configuration of the launch enclave 224 at runtime. The method 300 may be executed, for example, in response to a user command, in response to a request to the platform firmware 214, or in response to manageability commands received from the remote management server 104. In some embodiments, the computing device 102 may verify that the processor 120 supports managing the launch enclave 224, for example by verifying the presence of the launch enclave MSR 124.

In block 304, the computing device 102 determines whether to use trusted I/O to receive the launch enclave hash. The computing device 102 may use any appropriate criteria to determine whether to use trusted I/O. For example, the computing device 102 may determine whether to use trusted I/O based on configuration settings, based on whether the trusted execution environment 202 supports trusted I/O, based on whether configuration of the launch enclave 224 was initiated remotely, or any other criteria. If the computing device 102 determines not to use trusted I/O, the method 300 skips ahead to block 310, described below. If the computing device 102 determines to use trusted I/O, the method 300 advances to block 306.

In block 306, the platform firmware 214 requests the trusted execution environment 202 to start a trusted I/O session. The platform firmware 214 may use any technique to request the trusted I/O session. For example, the platform firmware 214 may send a request to the CSME 134 via the HECI bus or as a network request. In block 308, the trusted execution environment 202 opens a trusted I/O user interface. The trusted execution environment 202 may use any trusted I/O technique to open the trusted I/O session. For example, the trusted execution environment 202 may receive user input from one or more dedicated input devices (e.g., a dedicated PIN pad, keyboard, or other input device), or the trusted execution environment 202 may receive user input from one or more peripheral devices 136 via a secure communication path. In some embodiments, the trusted execution environment 202 may display a secure graphical user interface, for example using a protected audio/video path (PAVP) or other protected graphical output technique. Thus, by using trusted I/O provided by the trusted execution environment 202, the platform firmware 214 is capable of requesting a secure graphical user interface at runtime.

In block 310, the trusted execution environment 202 receives a launch enclave hash corresponding to a launch enclave 224 to be launched. As described above, the launch enclave hash may be embodied as a hash of a public key corresponding to the private key used to sign the launch enclave 224. The launch enclave 224 may be supplied and signed by, for example, the original equipment manufacturer (OEM) of the computing device 102. In block 312, the trusted execution environment 202 may receive the launch enclave hash from the user via the trusted I/O session. For example, the user may enter a hash value received via an out-of-band communication such as an email or text message. In some embodiments, the user may enter a passcode, pass phrase, or other secret that may be used to access the launch enclave hash. Additionally, the trusted I/O session may perform additional user interface tasks, such as obtaining user consent to update the launch enclave, performing a user authentication challenge, or performing other administrative tasks.

In some embodiments, in block 314, the trusted execution environment 202 may receive the launch enclave hash from the remote management server 104. For example, the remote management server 104 may push the launch enclave hash to the trusted execution environment 202 via an out-of-band network interface of the CSME 134. As described above, the remote management server 104 may be controlled by the OEM of the computing device 102, by an enterprise that deploys the computing device 102, or by another administrator of the computing device 102. In some embodiments, part or all of the launch enclave hash may be received from both the user via the trusted I/O session and the remote management server 104 via the network 106.

In block 316, the trusted execution environment 202 stores the launch enclave hash in the launch enclave hash table 206 after necessary verification. The launch enclave hash table 206 may be stored in any secure storage accessible to the trusted execution environment 202. For example, the launch enclave hash table 206 may be included in a secure partition or other secure part of the data storage device 130, in non-volatile platform flash memory, or in other non-volatile storage of the computing device 102. In some embodiments, the launch enclave hash table 206 may be capable of storing multiple launch enclave hashes. For example, the launch enclave hash table 206 may store a predetermined number of the most-recently used launch enclave hashes.

In block 318, in some embodiments the trusted execution environment 202 may store a launch configuration policy associated with the launch enclave hash in the launch enclave hash table 206. As described further below, the trusted execution environment 202 may evaluate the launch configuration policy at boot time to determine whether to allow a particular launch enclave hash to be used. Thus, the launch configuration policy may define one or more rules that may be evaluated by the computing device 102 to determine whether to allow the associated launch enclave hash. For example, the launch configuration policy may specify an allowed geographical region (a geofence), an allowed device context (e.g., particular times of day, work or personal, or other contextual data), an allowed platform lifecycle phase (e.g., manufacturing, in-transit, first power-on, deployed, etc.), or other criteria that may be evaluated to determine whether to allow the associated launch enclave hash.

In block 320, the trusted execution environment 202 provisions the launch enclave hash to the platform firmware 214 via an out-of-band communication channel. For example, the trusted execution environment 202 may provision the launch enclave hash to the platform firmware 214 via the HECI bus. The trusted execution environment 202 may securely transmit the launch enclave hash itself, an index of the launch enclave hash in the launch enclave hash table 206, or other indicator of the launch enclave hash.

In block 322, the platform firmware 214 may seal the launch enclave hash to a trusted firmware boot code 220. The platform firmware 214 may, for example, encrypt the launch enclave hash such that only a particular trusted firmware boot code 220 may decrypt the encrypted launch enclave hash. The trusted firmware boot code 220 may be embodied as, for example, trusted UEFI early boot code or other early boot code such as legacy BIOS or coreboot. Although illustrated as sealing the launch enclave hash, it should be understood that in some embodiments the computing device 102 may store the launch enclave hash in any manner so that the launch enclave hash is accessible to the platform firmware 214 during boot.

In block 324, the platform firmware 214 sets an OEM enclave launch bit (OELB). The OEM enclave launch bit may be embodied as any non-volatile data accessible by the platform firmware 214, such as a firmware variable, a CSME 134 register, data stored in platform non-volatile memory, or other data. As described further below in connection with FIG. 4, when the OELB is set, upon reset the computing device 102 may configure the launch enclave 224 to be used and determine whether to allow the use of the launch enclave 224 based on the launch enclave hash.

In block 326, the computing device 102 performs a platform reset. For example, the computing device 102 may reboot, power cycle, or otherwise reset the processor 120. The platform reset may be triggered by software such as the platform firmware 214 or an operating system of the computing device 102. Although illustrated as performing a platform reset, it should be understood that in some embodiments, the computing device 102 may not perform an immediate reset and instead the launch enclave 224 configuration may become effective upon the next reboot. In those embodiments, the platform reset may be caused by a user manually rebooting or otherwise power-cycling the computing device 102 and/or the computing device 102 may initiate the platform reset with an alert or other notification to the user via trusted I/O. After resetting, the computing device 102 boots and may execute a method for configuring the launch enclave as described below in connection with FIG. 4.

Figure 4:
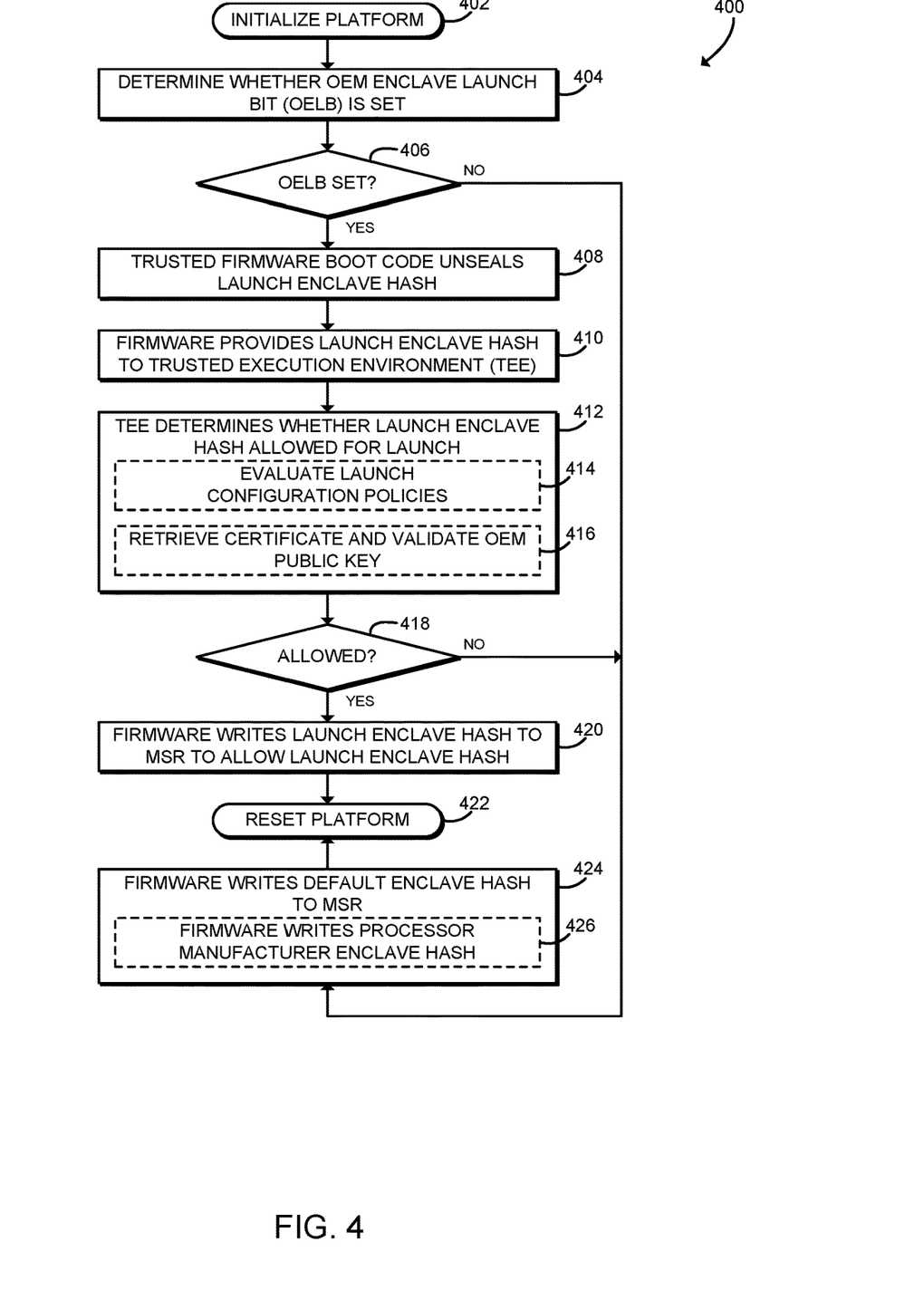
FIG. 4 is a simplified flow diagram of at least one embodiment of a method for boot configuration of a launch enclave that may be executed by the computing device of FIGS. 1-2.

Referring now to FIG. 4, in use, the computing device 102 may execute a method 400 for launch enclave configuration at boot time. It should be appreciated that, in some embodiments, the operations of the method 400 may be performed by one or more modules of the environment 200 of the computing device 102 as shown in FIG. 2. The method 400 begins in block 402, in which the computing device 102 performs platform initialization. The computing device 102 may initialize the platform by executing a pre-boot firmware environment of the platform firmware 214. For example, the computing device 102 may execute the trusted firmware boot code 220, which may initialize platform hardware components such as the processor 120, the memory 128, and/or other components of the computing device 102. As described above, the trusted firmware boot code 220 may be embodied as, for example, trusted UEFI early boot code or other early boot code such as legacy BIOS or coreboot.

In block 404, the platform firmware 214 determines whether the OEM enclave launch bit (OELB) is set. As described above in connection with block 324 of FIG. 3, the OELB may be set in response to the trusted execution environment 202 and the platform firmware 214 configuring a launch enclave hash at runtime. The OEM enclave launch bit may be embodied as any non-volatile data accessible by the platform firmware 214, such as a firmware variable, a CSME 134 register, data stored in platform non-volatile memory, or other data. In block 406, the computing device 102 checks whether the OELB is set. If not, the method 400 branches ahead to block 424, described below. If the OELB is set, the method 400 advances to block 408.

In block 408, the trusted firmware boot code 220 may unseal the launch enclave hash. As described above in connection with block 322 of FIG. 3, the launch enclave hash may have been sealed by the computing device 102 at runtime. To unseal the launch enclave hash, the trusted firmware boot code 220 may, for example, decrypt a launch enclave hash that has been encrypted such that only the trusted firmware boot code 220 may decrypt it. Additionally, although illustrated as unsealing the launch enclave hash, it should be understood that in some embodiments the trusted firmware boot code 220 may use any other technique to access the launch enclave hash.

In block 410, the platform firmware 214 provides the launch enclave hash to the trusted execution environment 202. For example, the platform firmware 214 may provide the launch enclave hash to the trusted execution environment 202 via the HECI bus. The platform firmware 214 may transmit the launch enclave hash itself, an index of the launch enclave hash in the launch enclave hash table 206, or other indicator of the launch enclave hash.

In block 412, the trusted execution environment 202 determines whether the launch enclave hash is allowed for launch. The trusted execution environment 202 may determine whether the launch enclave hash has been expressly allowed (i.e., whitelisted) for use. The trusted execution environment 202 may report whether the launch enclave hash is allowed to the platform firmware 214, for example via the HECI bus. If the launch enclave hash is not allowed, the trusted execution environment 202 may perform one or more policy-based actions, such as logging an error, notifying an administrator, shutting down the computing device 102, or performing any other appropriate security response. Additionally or alternatively, if the launch enclave hash is allowed, the trusted execution environment 202 may also notify an administrator, for example by sending a message to the remote management server 104.

In some embodiments, in block 414 the trusted execution environment 202 may evaluate one or more launch configuration policies associated with the launch enclave hash to determine whether to allow the launch enclave hash. As described above, each launch configuration policy may define one or more rules that may be evaluated by the computing device 102 to determine whether to allow the associated launch enclave hash. For example, the launch configuration policy may specify an allowed geographical region (geofence), an allowed device context (e.g., particular times of day, work or personal, or other contextual data), an allowed platform lifecycle phase (e.g., manufacturing, in-transit, first power-on, deployed, etc.), or other criteria that may be evaluated to determine whether to allow the associated launch enclave hash. Thus, the trusted execution environment 202 may allow and/or deny use of a particular launch enclave hash based on the location, context, lifecycle phase, or other current attributes of the computing device 102. In some embodiments, the trusted execution environment 202 may evaluate launch configuration policies associated with multiple launch enclave hashes and select a launch enclave hash based on the policy. For example, the trusted execution environment 202 may select a launch enclave hash from the launch enclave hash table 206 based on the associated launch configuration policies (e.g., based on which launch enclave hash is allowed).

In some embodiments, in block 416 the trusted execution environment 202 may retrieve a certificate and validate a public key associated with the launch enclave hash. As described above, the launch enclave hash is a hash of a public key associated with the private key used to sign the launch enclave 224. The trusted execution environment 202 may verify, for example, that the launch enclave hash corresponds to the public key of a known entity, such as the OEM of the computing device 102. Additionally or alternatively, the trusted execution environment 202 may verify that the public key associated with the launch enclave hash has not been revoked. For example, the trusted execution environment 202 may check for revocation via the online certificate status protocol (OCSP) or by checking certificate revocation lists from a certificate authority. The trusted execution environment 202 may perform revocation checks using, for example, an out-of-band network interface of the CSME 134.

In block 418, the computing device 102 checks whether the launch enclave hash was allowed. If not, the method 400 branches ahead to block 424, as described below. If the launch enclave hash is allowed, the method 400 advances to block 420, in which the platform firmware 214 writes the launch enclave hash to the launch enclave hash MSR 124. When the launch enclave hash is programmed to the launch enclave hash MSR 124, the processor 120 allows the launch enclave 224 corresponding to that launch enclave hash to be executed in a secure enclave using the secure enclave support 122. After writing to the launch enclave MSR 124, the method 400 advances to block 422, in which the computing device 102 performs a platform reset. After performing the platform reset, the method 400 is completed and the computing device 102 may load and execute the selected launch enclave 224. As described above, the launch enclave 224 may act as the software licensing root for software executed with the secure enclave support 122. The launch enclave 224 may launch or otherwise manage additional secure enclaves, including those provided by independent software vendors (ISVs). Additionally, as described above, instead of performing the platform reset, the launch enclave 224 configuration may become effective upon the next reboot (user initiated or system initiated with user notification via trusted I/O).

Referring back to block 406, if the OELB is not set, the method 400 branches to block 424. Additionally, referring back to block 418, if the launch enclave hash is not allowed, the method 400 also branches to block 424. In block 424, the platform firmware 214 writes a default launch enclave hash to the launch enclave MSR 124. The default launch enclave may include a predefined enclave, architectural enclave, or other well-known enclave provided by the computing device 102. In some embodiments, rather than writing a default launch enclave hash value, the platform firmware 214 may clear or otherwise set a default value to the launch enclave MSR 124. In some embodiments, in block 426, the platform firmware 214 may write a hash corresponding to a launch enclave provided by a manufacturer of the processor 120, such as a launch enclave provided by Intel Corporation. After writing to the launch enclave MSR 124, the method 400 advances to block 422, in which the computing device 102 performs a platform reset. After performing the platform reset, the method 400 is completed and the computing device 102 may load and execute the default launch enclave. As described above, the default launch enclave may act as the software licensing root for software executed with the secure enclave support 122. The default launch enclave may launch or otherwise manage additional secure enclaves, including those provided by independent software vendors (ISVs).

It should be appreciated that, in some embodiments, the methods 300 and/or 400 may be embodied as various instructions stored on a computer-readable media, which may be executed by the processor 120, the I/O subsystem 126, and/or other components of the computing device 102 to cause the computing device 102 to perform the respective method 300 and/or 400. The computer-readable media may be embodied as any type of media capable of being read by the computing device 102 including, but not limited to, the memory 128, the data storage device 130, firmware devices, and/or other media.

EXAMPLES

Illustrative examples of the technologies disclosed herein are provided below. An embodiment of the technologies may include any one or more, and any combination of, the examples described below.

Example 1 includes a computing device for configuring a launch enclave, the computing device comprising a trusted execution environment and platform firmware, wherein the trusted execution environment comprises a hash management module to (i) store a launch enclave hash in a launch enclave hash table in a secure storage of the computing device, and (ii) provision the launch enclave hash to the platform firmware; the platform firmware comprises a runtime module to (i) set a configure enclave launch bit in response to provision of the launch enclave hash to the platform firmware, and (ii) reset the computing device in response to setting of the configure enclave launch bit; the trusted execution environment comprises a launch policy module to determine whether the launch enclave hash is allowed for launch in response to the setting of the configure enclave launch bit and a reset of the computing device; and the platform firmware comprises a boot module to write the launch enclave hash to a launch enclave model-specific register of a processor of the computing device in response to a determination that the launch enclave hash is allowed for launch.

Example 2 includes the subject matter of Example 1, and wherein the boot module is further to determine whether the configure enclave launch bit is set in response to the reset of the computing device; and provide the launch enclave hash to the trusted execution environment in response to a determination that the configure enclave launch bit is set.

Example 3 includes the subject matter of any of Examples 1 and 2, and wherein the runtime module is further to seal the launch enclave hash to generate an encrypted hash bound to a trusted firmware boot code of the computing device in response to provision of the launch enclave hash to the platform firmware; and the boot module is further to unseal, by the trusted firmware boot code, the encrypted hash to recover the launch enclave hash in response to a determination that the configure enclave launch bit is set.

Example 4 includes the subject mater of any of Examples 1-3, and wherein the trusted boot code comprises a firmware image.

Example 5 includes the subject mater of any of Examples 1-4, and further comprising a launch enclave module to load a launch enclave in response to a write of the launch enclave hash to the launch enclave model-specific register, wherein the launch enclave is protected by secure enclave support of the processor, and wherein the launch enclave is verified with the launch enclave model-specific register of the processor.

Example 6 includes the subject mater of any of Examples 1-5, and wherein the trusted execution environment further comprises a trusted I/O module to (i) open a trusted I/O session and (ii) receive the launch enclave hash via the trusted I/O session; wherein to store the launch enclave hash comprises to store the launch enclave hash in response to receipt of the launch enclave hash.

Example 7 includes the subject mater of any of Examples 1-6, and wherein the runtime module is further to request the trusted execution environment to start the trusted I/O session; and to open the trusted I/O session comprises to open the trusted I/O session in response to a request to the trusted execution environment to start the trusted I/O session.

Example 8 includes the subject mater of any of Examples 1-7, and wherein the trusted execution environment further comprises a remote management module to receive the launch enclave hash from a remote management server via an out-of-band network connection; to store the launch enclave hash comprises to store the launch enclave hash in response to receipt of the launch enclave hash.

Example 9 includes the subject mater of any of Examples 1-8, and wherein the launch enclave hash comprises a hash of a public key, wherein the launch enclave is signed by a private key corresponding to the public key.

Example 10 includes the subject matter of any of Examples 1-9, and wherein to determine whether the launch enclave hash is allowed for launch comprises to receive a certificate corresponding to the public key and to validate the public key with the certificate.

Example 11 includes the subject matter of any of Examples 1-10, and wherein to validate the public key with the certificate comprises to perform a certificate revocation check.

Example 12 includes the subject matter of any of Examples 1-11, and wherein the hash management module is further to update the launch enclave hash table with a launch policy associated with the launch enclave hash in response to storage of the launch enclave hash.

Example 13 includes the subject matter of any of Examples 1-12, and wherein to determine whether the launch enclave hash is allowed for launch comprises to evaluate the launch policy associated with the launch enclave hash.

Example 14 includes the subject matter of any of Examples 1-13, and wherein to evaluate the launch policy comprises to determine a location of the computing device, to determine a device context of the computing device, or to determine a platform lifecycle phase of the computing device.

Example 15 includes the subject mater of any of Examples 1-14, and wherein the launch policy module is further to select the launch enclave hash from the launch enclave hash table based on the associated launch policy, wherein the launch enclave hash table stores a plurality of launch enclave hashes.

Example 16 includes the subject mater of any of Examples 1-15, and further comprising a converged security and manageability engine, wherein the converged security and manageability engine comprises the trusted execution environment.

Example 17 includes the subject mater of any of Examples 1-16, and wherein the boot module is further to write a default launch enclave hash to the launch enclave model-specific register in response to a determination that the configure enclave launch bit is not set.

Example 18 includes the subject mater of any of Examples 1-17, and wherein the launch policy module is further to perform a policy-based action in response to a determination that the launch enclave hash is not allowed for launch.

Example 19 includes the subject mater of any of Examples 1-18, and wherein the launch policy module is further to notify a remote administrator in response to the determination that the launch enclave hash is allowed for launch.

Example 20 includes a method for configuring a launch enclave, the method comprising storing, by a trusted execution environment of a computing device, a launch enclave hash in a launch enclave hash table in a secure storage of the computing device; provisioning, by the trusted execution environment, the launch enclave hash to a platform firmware of the computing device; setting, by the platform firmware, a configure enclave launch bit in response to provisioning the launch enclave hash to the platform firmware; resetting, by the platform firmware, the computing device in response to setting the configure enclave launch bit; determining, by the trusted execution environment, whether the launch enclave hash is allowed for launch in response to setting the configure enclave launch bit and resetting the computing device; and writing, by the platform firmware, the launch enclave hash to a launch enclave model-specific register of a processor of the computing device in response to determining that the launch enclave hash is allowed for launch.

Example 21 includes the subject mater of Example 20, and further comprising determining, by the platform firmware, whether the configure enclave launch bit is set in response to resetting the computing device; and providing, by the platform firmware, the launch enclave hash to the trusted execution environment in response to determining that the configure enclave launch bit is set.

Example 22 includes the subject mater of any of Examples 20 and 21, and further comprising sealing, by the platform firmware, the launch enclave hash to generate an encrypted hash bound to a trusted firmware boot code of the computing device in response to provisioning the launch enclave hash to the platform firmware; and unsealing, by the trusted firmware boot code, the encrypted hash to recover the launch enclave hash in response to determining that the configure enclave launch bit is set.

Example 23 includes the subject mater of any of Examples 20-22, and wherein the trusted boot code comprises a firmware image.

Example 24 includes the subject mater of any of Examples 20-23, and further comprising loading, by the computing device, a launch enclave in response to writing the launch enclave hash to the launch enclave model-specific register, wherein the launch enclave is protected by secure enclave support of the processor, and wherein the launch enclave is verified using the launch enclave model-specific register of the processor.

Example 25 includes the subject mater of any of Examples 20-24, and further comprising opening, by the trusted execution environment, a trusted I/O session; and receiving, by the trusted execution environment, the launch enclave hash via the trusted I/O session; wherein storing the launch enclave hash comprises storing the launch enclave hash in response to receiving the launch enclave hash.

Example 26 includes the subject mater of any of Examples 20-25, and further comprising requesting, by the platform firmware, the trusted execution environment to start the trusted I/O session; wherein opening the trusted I/O session comprises opening the trusted I/O session in response to requesting the trusted execution environment to start the trusted I/O session.

Example 27 includes the subject mater of any of Examples 20-26, and further comprising receiving, by the trusted execution environment, the launch enclave hash from a remote management server via an out-of-band network connection; wherein storing the launch enclave hash comprises storing the launch enclave hash in response to receiving the launch enclave hash.

Example 28 includes the subject mater of any of Examples 20-27, and wherein the launch enclave hash comprises a hash of a public key, wherein the launch enclave is signed by a private key corresponding to the public key.

Example 29 includes the subject mater of any of Examples 20-28, and wherein determining whether the launch enclave hash is allowed for launch comprises receiving a certificate corresponding to the public key and validating the public key using the certificate.

Example 30 includes the subject mater of any of Examples 20-29, and wherein validating the public key with the certificate comprises performing a certificate revocation check.

Example 31 includes the subject mater of any of Examples 20-30, and further comprising updating, by the trusted execution environment, the launch enclave hash table with a launch policy associated with the launch enclave hash in response to storing the launch enclave hash.

Example 32 includes the subject mater of any of Examples 20-31, and wherein determining whether the launch enclave hash is allowed for launch comprises evaluating the launch policy associated with the launch enclave hash.

Example 33 includes the subject mater of any of Examples 20-32, and wherein evaluating the launch policy comprises determining a location of the computing device, determining a device context of the computing device, or determining a platform lifecycle phase of the computing device.

Example 34 includes the subject mater of any of Examples 20-33, and further comprising selecting, by the trusted execution environment, the launch enclave hash from the launch enclave hash table based on the associated launch policy, wherein the launch enclave hash table stores a plurality of launch enclave hashes.

Example 35 includes the subject mater of any of Examples 20-34, and further comprising establishing, by a converged security and manageability engine of the computing device, the trusted execution environment.

Example 36 includes the subject mater of any of Examples 20-35, and further comprising writing, by the trusted firmware boot code, a default launch enclave hash to the launch enclave model-specific register in response to determining that the configure enclave launch bit is not set.

Example 37 includes the subject mater of any of Examples 20-36, and further comprising performing, by the trusted execution environment, a policy-based action in response to determining that the launch enclave hash is not allowed for launch.

Example 38 includes the subject mater of any of Examples 20-37, and further comprising notifying, by the trusted execution environment, a remote administrator in response to determining that the launch enclave hash is allowed for launch.

Example 39 includes a computing device comprising a processor; and a memory having stored therein a plurality of instructions that when executed by the processor cause the computing device to perform the method of any of Examples 20-38.

Example 40 includes one or more machine readable storage media comprising a plurality of instructions stored thereon that in response to being executed result in a computing device performing the method of any of Examples 20-38.

Example 41 includes a computing device comprising means for performing the method of any of Examples 20-38.

Example 42 includes a computing device for configuring a launch enclave, the computing device comprising means for storing, by a trusted execution environment of the computing device, a launch enclave hash in a launch enclave hash table in a secure storage of the computing device; means for provisioning, by the trusted execution environment, the launch enclave hash to a platform firmware of the computing device; means for setting, by the platform firmware, a configure enclave launch bit in response to provisioning the launch enclave hash to the platform firmware; means for resetting, by the platform firmware, the computing device in response to setting the configure enclave launch bit; means for determining, by the trusted execution environment, whether the launch enclave hash is allowed for launch in response to setting the configure enclave launch bit and resetting the computing device; and means for writing, by the platform firmware, the launch enclave hash to a launch enclave model-specific register of a processor of the computing device in response to determining that the launch enclave hash is allowed for launch.

Example 43 includes the subject mater of Example 42, and further comprising means for determining, by the platform firmware, whether the configure enclave launch bit is set in response to resetting the computing device; and means for providing, by the platform firmware, the launch enclave hash to the trusted execution environment in response to determining that the configure enclave launch bit is set.

Example 44 includes the subject mater of any of Examples 42 and 43, and further comprising means for sealing, by the platform firmware, the launch enclave hash to generate an encrypted hash bound to a trusted firmware boot code of the computing device in response to provisioning the launch enclave hash to the platform firmware; and means for unsealing, by the trusted firmware boot code, the encrypted hash to recover the launch enclave hash in response to determining that the configure enclave launch bit is set.

Example 45 includes the subject mater of any of Examples 42-44, and wherein the trusted boot code comprises a firmware image.

Example 46 includes the subject mater of any of Examples 42-45, and further comprising means for loading a launch enclave in response to writing the launch enclave hash to the launch enclave model-specific register, wherein the launch enclave is protected by secure enclave support of the processor, and wherein the launch enclave is verified using the launch enclave model-specific register of the processor.

Example 47 includes the subject mater of any of Examples 42-46, and further comprising means for opening, by the trusted execution environment, a trusted I/O session; and means for receiving, by the trusted execution environment, the launch enclave hash via the trusted I/O session; wherein the means for storing the launch enclave hash comprises means for storing the launch enclave hash in response to receiving the launch enclave hash.

Example 48 includes the subject mater of any of Examples 42-47, and further comprising means for requesting, by the platform firmware, the trusted execution environment to start the trusted I/O session; wherein the means for opening the trusted I/O session comprises means for opening the trusted I/O session in response to requesting the trusted execution environment to start the trusted I/O session.

Example 49 includes the subject mater of any of Examples 42-48, and further comprising means for receiving, by the trusted execution environment, the launch enclave hash from a remote management server via an out-of-band network connection; wherein the means for storing the launch enclave hash comprises means for storing the launch enclave hash in response to receiving the launch enclave hash.

Example 50 includes the subject mater of any of Examples 42-49, and wherein the launch enclave hash comprises a hash of a public key, wherein the launch enclave is signed by a private key corresponding to the public key.

Example 51 includes the subject mater of any of Examples 42-50, and wherein the means for determining whether the launch enclave hash is allowed for launch comprises means for receiving a certificate corresponding to the public key and validating the public key using the certificate.

Example 52 includes the subject mater of any of Examples 42-51, and wherein the means for validating the public key with the certificate comprises means for performing a certificate revocation check.

Example 53 includes the subject mater of any of Examples 42-52, and further comprising means for updating, by the trusted execution environment, the launch enclave hash table with a launch policy associated with the launch enclave hash in response to storing the launch enclave hash.

Example 54 includes the subject mater of any of Examples 42-53, and wherein the means for determining whether the launch enclave hash is allowed for launch comprises means for evaluating the launch policy associated with the launch enclave hash.

Example 55 includes the subject mater of any of Examples 42-54, and wherein the means for evaluating the launch policy comprises means for determining a location of the computing device, means for determining a device context of the computing device, or means for determining a platform lifecycle phase of the computing device.

Example 56 includes the subject mater of any of Examples 42-55, and further comprising means for selecting, by the trusted execution environment, the launch enclave hash from the launch enclave hash table based on the associated launch policy, wherein the launch enclave hash table stores a plurality of launch enclave hashes.

Example 57 includes the subject mater of any of Examples 42-56, and further comprising means for establishing, by a converged security and manageability engine of the computing device, the trusted execution environment.

Example 58 includes the subject mater of any of Examples 42-57, and further comprising means for writing, by the trusted firmware boot code, a default launch enclave hash to the launch enclave model-specific register in response to determining that the configure enclave launch bit is not set.

Example 59 includes the subject mater of any of Examples 42-58, and further comprising means for performing, by the trusted execution environment, a policy-based action in response to determining that the launch enclave hash is not allowed for launch.

Example 60 includes the subject mater of any of Examples 42-59, and further comprising means for notifying, by the trusted execution environment, a remote administrator in response to determining that the launch enclave hash is allowed for launch.

The invention claimed is:

1. A computing device to configure a launch enclave, the computing device comprising a trusted execution environment and platform firmware, wherein:
the trusted execution environment comprises a hash management module to (i) store a launch enclave hash in a launch enclave hash table in a secure storage of the computing device, and (ii) provision the launch enclave hash to the platform firmware;
the platform firmware comprises a runtime module to (i) set a configure enclave launch bit in response to provision of the launch enclave hash to the platform firmware, and (ii) reset the computing device in response to setting of the configure enclave launch bit;
the trusted execution environment comprises a launch policy module to determine whether the launch enclave hash is allowed for launch in response to the setting of the configure enclave launch bit and a reset of the computing device; and
the platform firmware comprises a boot module to write the launch enclave hash to a launch enclave model-specific register of a processor of the computing device in response to a determination that the launch enclave hash is allowed for launch.

2. The computing device of claim 1, wherein the boot module is further to:
determine whether the configure enclave launch bit is set in response to the reset of the computing device; and
provide the launch enclave hash to the trusted execution environment in response to a determination that the configure enclave launch bit is set.

3. The computing device of claim 1, wherein:
the runtime module is further to seal the launch enclave hash to generate an encrypted hash bound to a trusted firmware boot code of the computing device in response to provision of the launch enclave hash to the platform firmware; and
the boot module is further to unseal, by the trusted firmware boot code, the encrypted hash to recover the launch enclave hash in response to a determination that the configure enclave launch bit is set.

4. The computing device of claim 1, further comprising a launch enclave module to load a launch enclave in response to a write of the launch enclave hash to the launch enclave model-specific register, wherein the launch enclave is protected by secure enclave support of the processor, and wherein the launch enclave is verified with the launch enclave model-specific register of the processor.

5. The computing device of claim 1, wherein:
the trusted execution environment further comprises a trusted I/O module to (i) open a trusted I/O session and (ii) receive the launch enclave hash via the trusted I/O session;
wherein to store the launch enclave hash comprises to store the launch enclave hash in response to receipt of the launch enclave hash.

6. The computing device of claim 1, wherein:
the trusted execution environment further comprises a remote management module to receive the launch enclave hash from a remote management server via an out-of-band network connection;
to store the launch enclave hash comprises to store the launch enclave hash in response to receipt of the launch enclave hash.

7. The computing device of claim 1, wherein the launch enclave hash comprises a hash of a public key, wherein the launch enclave is signed by a private key corresponding to the public key.

8. The computing device of claim 7, wherein to determine whether the launch enclave hash is allowed for launch comprises to receive a certificate corresponding to the public key and to validate the public key with the certificate.

9. The computing device of claim 8, wherein to validate the public key with the certificate comprises to perform a certificate revocation check.

10. The computing device of claim 1, wherein the hash management module is further to update the launch enclave hash table with a launch policy associated with the launch enclave hash in response to storage of the launch enclave hash.

11. The computing device of claim 10, wherein to determine whether the launch enclave hash is allowed for launch comprises to evaluate the launch policy associated with the launch enclave hash.

12. The computing device of claim 11, wherein the launch policy module is further to select the launch enclave hash from the launch enclave hash table based on the associated launch policy, wherein the launch enclave hash table stores a plurality of launch enclave hashes.

13. The computing device of claim 1, further comprising a converged security and manageability engine, wherein the converged security and manageability engine comprises the trusted execution environment.

14. A method for configuring a launch enclave, the method comprising:
storing, by a trusted execution environment of a computing device, a launch enclave hash in a launch enclave hash table in a secure storage of the computing device;
provisioning, by the trusted execution environment, the launch enclave hash to a platform firmware of the computing device;
setting, by the platform firmware, a configure enclave launch bit in response to provisioning the launch enclave hash to the platform firmware;
resetting, by the platform firmware, the computing device in response to setting the configure enclave launch bit;
determining, by the trusted execution environment, whether the launch enclave hash is allowed for launch in response to setting the configure enclave launch bit and resetting the computing device; and
writing, by the platform firmware, the launch enclave hash to a launch enclave model-specific register of a processor of the computing device in response to determining that the launch enclave hash is allowed for launch.

15. The method of claim 14, further comprising:
determining, by the platform firmware, whether the configure enclave launch bit is set in response to resetting the computing device; and
providing, by the platform firmware, the launch enclave hash to the trusted execution environment in response to determining that the configure enclave launch bit is set.

16. The method of claim 14, further comprising updating, by the trusted execution environment, the launch enclave hash table with a launch policy associated with the launch enclave hash in response to storing the launch enclave hash.

17. The method of claim 16, wherein determining whether the launch enclave hash is allowed for launch comprises evaluating the launch policy associated with the launch enclave hash.

18. The method of claim 17, further comprising selecting, by the trusted execution environment, the launch enclave hash from the launch enclave hash table based on the associated launch policy, wherein the launch enclave hash table stores a plurality of launch enclave hashes.

19. One or more non-transitory, computer-readable storage media comprising a plurality of instructions that in response to being executed cause a computing device to:
store, by a trusted execution environment of the computing device, a launch enclave hash in a launch enclave hash table in a secure storage of the computing device;
provision, by the trusted execution environment, the launch enclave hash to a platform firmware of the computing device;
set, by the platform firmware, a configure enclave launch bit in response to provisioning the launch enclave hash to the platform firmware;
reset, by the platform firmware, the computing device in response to setting the configure enclave launch bit;
determine, by the trusted execution environment, whether the launch enclave hash is allowed for launch in response to setting the configure enclave launch bit and resetting the computing device; and
write, by the platform firmware, the launch enclave hash to a launch enclave model-specific register of a processor of the computing device in response to determining that the launch enclave hash is allowed for launch.

20. The one or more non-transitory, computer-readable storage media of claim 19, further comprising a plurality of instructions that in response to being executed cause the computing device to:
determine, by the platform firmware, whether the configure enclave launch bit is set in response to resetting the computing device; and
provide, by the platform firmware, the launch enclave hash to the trusted execution environment in response to determining that the configure enclave launch bit is set.

21. The one or more non-transitory, computer-readable storage media of claim 19, further comprising a plurality of instructions that in response to being executed cause the computing device to:
open, by the trusted execution environment, a trusted I/O session; and
receive, by the trusted execution environment, the launch enclave hash via the trusted I/O session;
wherein to store the launch enclave hash comprises to store the launch enclave hash in response to receiving the launch enclave hash.

22. The one or more non-transitory, computer-readable storage media of claim 19, further comprising a plurality of instructions that in response to being executed cause the computing device to:
receive, by the trusted execution environment, the launch enclave hash from a remote management server via an out-of-band network connection;
wherein to store the launch enclave hash comprises to store the launch enclave hash in response to receiving the launch enclave hash.

23. The one or more non-transitory, computer-readable storage media of claim 19, further comprising a plurality of instructions that in response to being executed cause the computing device to update, by the trusted execution environment, the launch enclave hash table with a launch policy associated with the launch enclave hash in response to storing the launch enclave hash.

24. The one or more non-transitory, computer-readable storage media of claim 23, wherein to determine whether the launch enclave hash is allowed for launch comprises to evaluate the launch policy associated with the launch enclave hash.

25. The one or more non-transitory, computer-readable storage media of claim 24, further comprising a plurality of instructions that in response to being executed cause the computing device to select, by the trusted execution environment, the launch enclave hash from the launch enclave hash table based on the associated launch policy, wherein the launch enclave hash table stores a plurality of launch enclave hashes.

* * * * *